(12) United States Patent
Sparidaens et al.

(10) Patent No.: US 9,319,570 B2
(45) Date of Patent: Apr. 19, 2016

(54) ADJUSTABLE SHOULDER PAD

(71) Applicant: GVBB HOLDINGS S.A.R.L., Luxembourg (LU)

(72) Inventors: Freek Adrianus Maria Sparidaens, Eindhoven (NL); Menno De Waal, Breda (NL); Charles Gerardus Josephus Poncin, Breda (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 120 days.

(21) Appl. No.: 14/019,465

(22) Filed: Sep. 5, 2013

(65) Prior Publication Data

US 2014/0063337 A1  Mar. 6, 2014

Related U.S. Application Data

(60) Provisional application No. 61/697,226, filed on Sep. 5, 2012.

(51) Int. Cl.
*H04N 5/225* (2006.01)
*G03B 17/56* (2006.01)
*F16M 13/00* (2006.01)
*F16M 13/04* (2006.01)

(52) U.S. Cl.
CPC ............. *H04N 5/2251* (2013.01); *F16M 13/00* (2013.01); *F16M 13/04* (2013.01); *G03B 17/563* (2013.01)

(58) Field of Classification Search
CPC ... H04N 5/2251; H04N 5/2252; F16M 13/00; F16M 13/04; G03B 17/00; G03B 17/563
See application file for complete search history.

(56) References Cited

U.S. PATENT DOCUMENTS

| | | | | |
|---|---|---|---|---|
| 4,083,480 A | * | 4/1978 | Lee et al. | 224/185 |
| 4,244,500 A | * | 1/1981 | Fournier | 224/265 |
| 4,389,675 A | * | 6/1983 | Suzuki et al. | 348/376 |
| 4,887,318 A | * | 12/1989 | Weinreb | 2/268 |
| 5,612,756 A | * | 3/1997 | Kardach | 396/422 |
| 6,641,010 B2 | * | 11/2003 | Greene | 224/265 |

FOREIGN PATENT DOCUMENTS

| | | | |
|---|---|---|---|
| JP | 08-279943 | * | 10/1996 |
| JP | 2011-244125 | * | 12/2011 |

* cited by examiner

*Primary Examiner* — Luong T Nguyen
(74) *Attorney, Agent, or Firm* — Arent Fox LLP

(57) ABSTRACT

An apparatus for a video camera facilitates the use of the camera by an operator. A shoulder mount may comprise one or more pads that may be movably attached to a mounting or reinforcing plate and coupled to a mechanism that facilitates the rotation, translation and/or tilting of the pads. One or more releases may be positioned to permit an operator to actuate the mechanisms and to unlock and reposition the pads with respect to the camera body. A tripod configuration may be defined in which all pads are fully confined within the volume of a recess of the camera body, thereby permitting attachment of a tripod or other mechanical mount.

21 Claims, 10 Drawing Sheets

ADJUSTABLE SHOULDER PAD

CROSS-REFERENCE TO RELATED APPLICATION

This application claims priority to U.S. Provisional Patent Application No. 61/697,226, filed on Sep. 5, 2012.

BACKGROUND

1. Field

The present disclosure relates generally to broadcast video systems, and more particularly, to shoulder-mounted cameras.

2. Background

Video cameras are frequently used in broadcast video operations when camera mobility is required, particularly in mobile operations, including various outside broadcast activities. In these environments, the weight of the camera is carried on the shoulder of an operator or by hand, when filming from the hip, waist or other low angle. Operators may suffer from muscle fatigue and strain resulting from efforts to stabilize the camera, to compensate for their own movements, and when the load of the camera is unevenly distributed on the shoulder.

SUMMARY

In an aspect of the disclosure, a shoulder mount is provided for a video camera. The shoulder mount may comprise a base plate adapted to be fastened to a camera body, and at least one pad movably attached to the base plate. In some embodiments, the shoulder mount may comprise one or more releases that, when actuated, enable the at least one pad to be repositioned with respect to the camera body. In some embodiments, the at least one pad is fully confined within a recess of the camera body in a first configuration.

In an aspect of the disclosure, a front surface of the camera body may have a lens attachment that receives and attaches a lens. The recess may be at least partially arcuate in form and may be located on a bottom surface of the camera body, below and behind the lens attachment. The at least one pad may comprise a pad that translates toward the front of the camera body and downwards from the camera body when a first release is actuated. The at least one pad may comprise a pad that rotates when the first release is actuated. In some embodiments, the rotatable pad may rotate about an axis that may be located within or adjacent to the recess. In some embodiments, the axis of rotation may be relocatable.

In an aspect of the disclosure, the at least one pad may comprise a pad that rotates about an axis perpendicular to the axis of the recess when a second release is actuated. The axis perpendicular to the axis of the recess may be located proximate to an edge of the bottom surface of the camera body.

In an aspect of the disclosure, a grip may be fixedly attached to the base proximate to another edge of the bottom surface of the camera body and may extend away from the two edges. The two edges may be substantially parallel with respect to one another.

In an aspect of the disclosure, a front surface of the camera body may have a lens attachment that receives and attaches a lens. The at least one pad may comprise a first pad that rotates about an axis parallel to an edge of a bottom surface of the camera body. The edge may be perpendicular to the front surface and extend from the front surface toward a rear surface of the camera. The first pad may rotate when a first release is actuated.

In an aspect of the disclosure, the recess may be arcuate and may be located on a bottom surface of the camera body. The bottom surface may be perpendicular to the front surface.

In an aspect of the disclosure, the at least one pad may comprise a pad that translates toward the front surface of the camera body and downwards from the bottom surface when a second release is actuated.

In an aspect of the disclosure, the at least one pad comprises a pad that rotates about an axis parallel to an axis of the recess when the second release is actuated.

In an aspect of the disclosure, a grip may be fixedly attached to another edge of the bottom surface of the camera body that extends away from the two edges of the bottom surface of the camera body. The two edges may be substantially parallel relative to each other.

In an aspect of the disclosure, the at least one pad may comprise a plurality of layers. The plurality of layers may include a stiffening layer. The stiffening layer may include one or more of a metallic layer and a polymer layer. The plurality of layers may include a layer constructed from rubber. The plurality of layers may include a layer constructed from a soft material such as memory foam, silicone rubber and/or memory rubber, to provide comfort and maintain stability of the camera.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of video production systems will now be presented with reference to various apparatus and methods. These apparatus and methods will be described in the following detailed description and illustrated in the accompanying drawing by various blocks, modules, components, steps, processes, etc. (collectively referred to as "elements"). These elements may be implemented using various hardware components known to those skilled in the mechanical arts.

Whether such elements are implemented as described depends upon the particular application and design constraints imposed on the overall system.

Figure 1A:
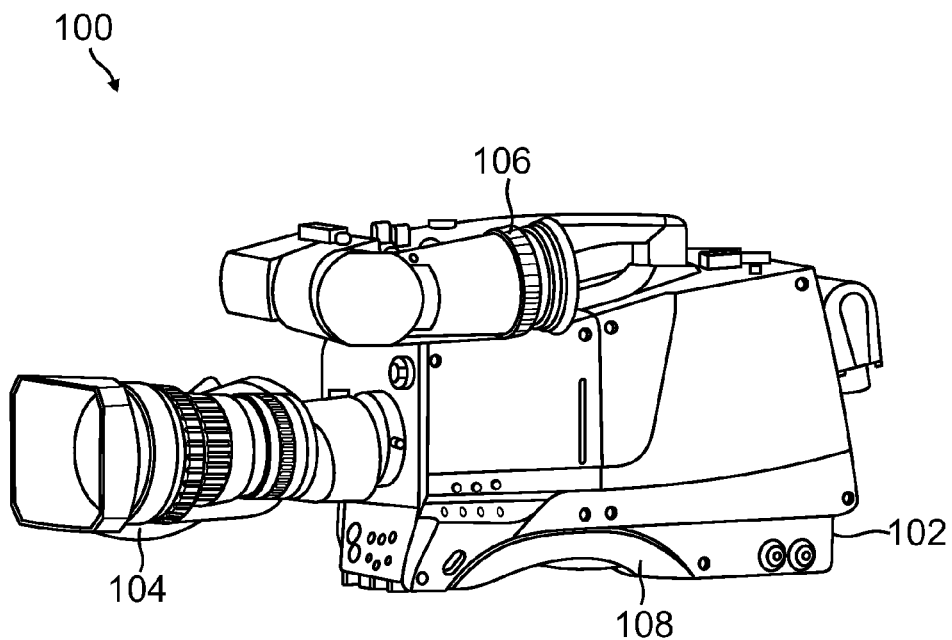
FIG. 1A illustrates a side perspective view of a camera with a shoulder pad system.
Figure 1B:
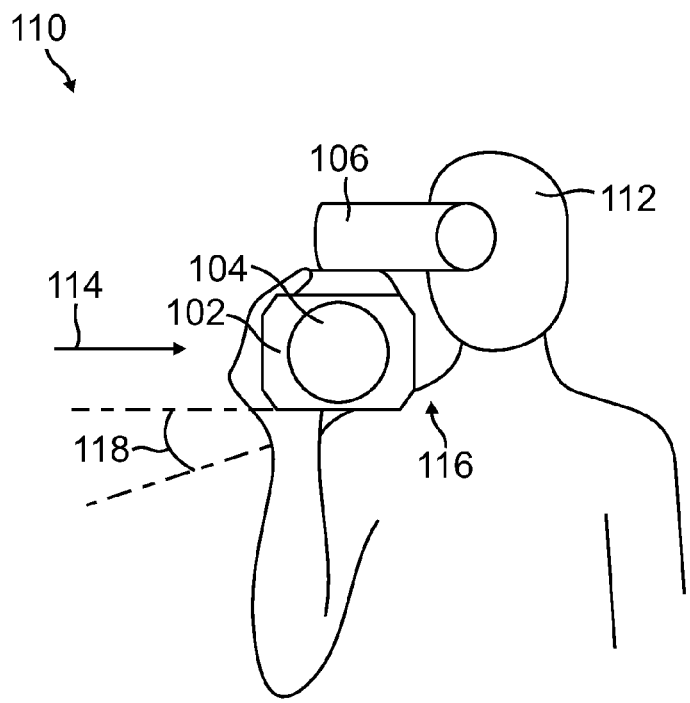
FIG. 1B illustrates an example use of the camera with the shoulder pad system.

FIG. 1A illustrates various perspective views of a camera with a shoulder pad system. FIG. 1B illustrates an example use of the camera with the shoulder pad system. Camera 100 is intended to be carried on an operator's shoulder 116 or mounted on a tripod. Camera 100 may also be carried by the operator at waist, hip or knee level. Camera 100 may be used in mobile applications including, for example, electronic news gathering and sports coverage. As illustrated generally at 110, when a camera 100 is carried on the shoulder 116 of an operator 112, the operator 112 may secure and operate the lens 104 while viewing a scene captured by the camera 100 through a viewfinder 106. In some instances, operator 112 may additionally secure the camera by pressure 114 applied to camera body 102 in order to stabilize the image observed through the viewfinder.

Certain embodiments of the invention provide a pad 108 that secures the camera 100 mounted on a shoulder 116 of an operator 112 by providing a closer fit between a base of the camera 100 and the shoulder 116. A pad 108 may comprise a memory foam that conforms to the shape of the shoulder 116, thereby spreading the weight of the camera 100 over a greater area and providing a more comfortable fit to the shoulder 116. The pad 108 may be integrated with camera body 102 in a manner that permits the camera 100 to be easily mounted on a tripod.

Figure 2A:
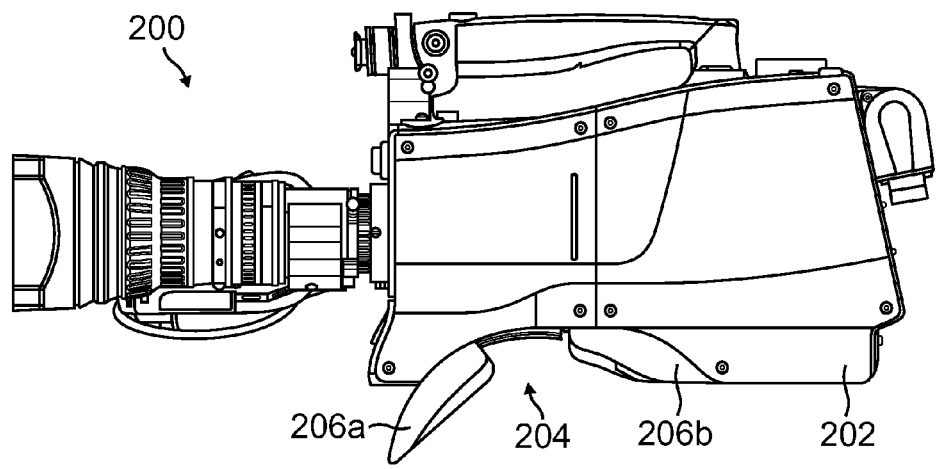
FIGS. 2A-2B illustrate various side perspective views of the camera with the shoulder pad system.
Figure 2B:
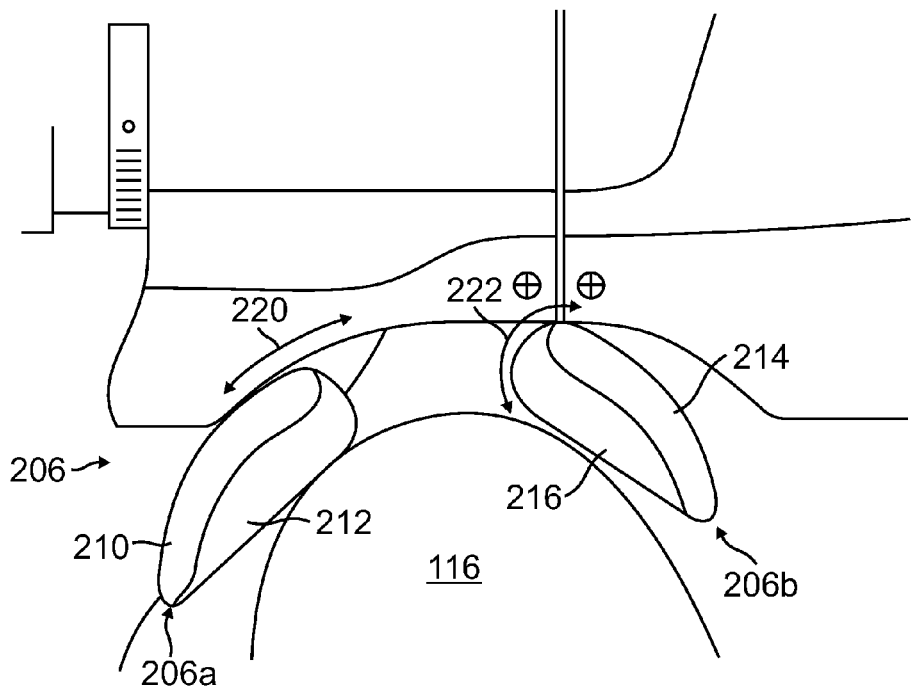

FIGS. 2A-2B illustrate various side perspective views of the camera 200 with the shoulder pad system. A shoulder pad system 206 of a camera 200 is configurable to provide improved support and comfort when fitted to a shoulder 116 of an operator 112. Shoulder mount system, indicated generally at 206, includes at least one pad 206a and/or 206b that can be relocated, rotated and/or otherwise manipulated to provide a closer fit to the shoulder 116 of an operator 112. As previously described, the shoulder mount 206 may be configured such that the one or more pads 206a and/or 206b are fully retracted within a recess 204 in the camera body 202. In one example, the recess 204 may be curved and one or more pads 206a and/or 206b may translate in a path that is generally concentric with an arc or profile of the recess 204. When recessed, the one or more pads 206a and/or 206b may provide a comfortable fit for some operators 112, but an operator may adjust the one or more pads 206a and/or 206b to obtain a customized fit. The pad system 206 may comprise two or more pad elements 206a and 206b and a mechanism for manipulating pad elements 206a and 206b.

Figure 3A:
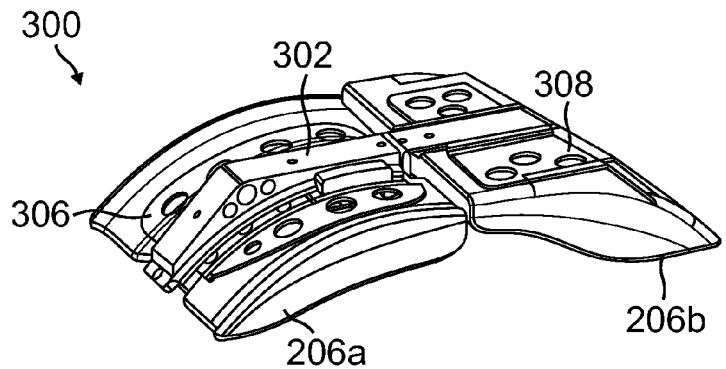
FIGS. 3A-3C illustrate various perspective views of an example mechanism of a shoulder pad system.
Figure 3B:
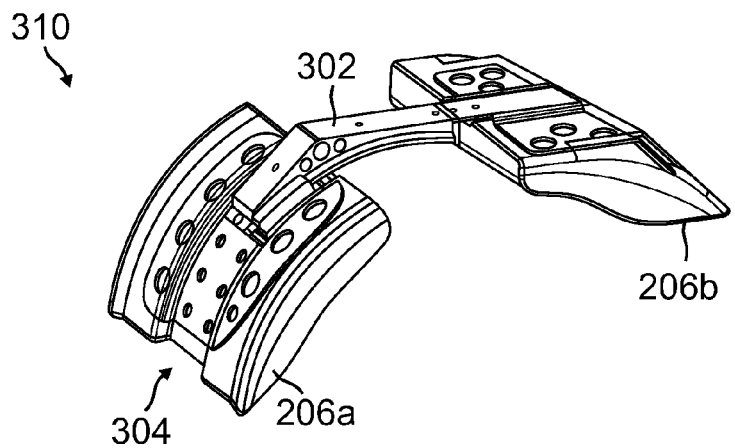
Figure 3C:
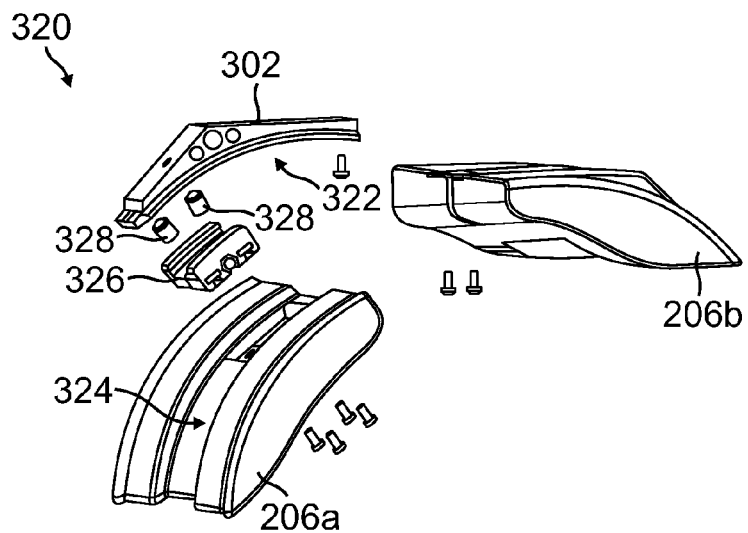

FIGS. 3A-3C illustrate various perspective views of an example mechanism of a shoulder pad system. More specifically, FIGS. 3A-3C illustrate an example of a mechanism used to manipulate pad elements 206a and 206b. Each pad 206a and 206b may comprise a base portion 210, 214 and a contact layer 212, 216. Base portions 210 and 214 may include a stiffening and/or load bearing member. In some embodiments, base portions 210 and 214 may be constructed or formed from one or more metallic, hard rubber, carbon fiber, polymer and/or silicone layers. In one example, a metallic layer may mechanically strengthen and/or stiffen a pad 206a and/or 206b, and may be disposed within a hard rubber shell. Strengthening/stiffening members may comprise aluminum, titanium, steel, an alloy, carbon fiber, polymer, and/or another material. Pads 206a and/or 206b may include a contact layer 212 and/or 216 that provides a soft interface with the body of the operator 112. The contact layer 212 and/or 216 may comprise a conforming material such as a urethane foam, micro-beads, memory foam, etc.

The configuration and/or orientation of one or both pad elements 206a and 206b may be adjusted to obtain an improved fit to a shoulder 116 of operator 112. The relative location, orientation and/or extension of the pad elements 206a and 206b may be altered while the camera is carried by an operator 112. In the example depicted in FIG. 2, an operator 112 may cause pad element 206a to slide along an arc 220 such that the pad element 206a extends beyond the recess 204 of camera body 202. Pad element 206b may be fixed in one position. In some embodiments, the operator 112 may also cause pad element 206b to rotate as indicated at 222. One or both pad elements 206a and 206b may be lockable in a desired orientation and/or position to ensure load distribution and to securely seat the camera 200 on the shoulder 116 of the operator 112.

In a first configuration 300, the pads 206a and 206b are fully retracted. In a second configuration, pad 206a is extended. An assembly drawing 320 is provided to assist understanding. The pad system comprises a pair of pads 206a and 206b, which mount on base plates 306 and 308, respectively. Base plates 306 and 308 may provide reinforcement and may be constructed from metal, polymer, carbon fiber, etc. A sliding rail system may comprise a rail 302 that may serve to fasten the mechanism 300 to the base of a camera 200, typically within a recess 204 of the camera. Pad 206b may be fixedly mounted to rail 302, while pad 206a may be movably mounted in a manner that permits the pad 206a to be translated along a predefined trajectory. In this example, the trajectory is curved and defined by the shape of the pad 206a and the rail 302. In particular, a carriage 326 fastened to a pad 206a may be configured to travel along a track 324 provided on a surface of rail 302. One or more spring loaded ball plungers 328 may be used to a carriage 326 to a rail 302 at certain positions on track 324. The forces exerted by ball plungers 328 may be overcome when the operator 112 pulls or pushes pad 206a with sufficient force.

Figure 4A:
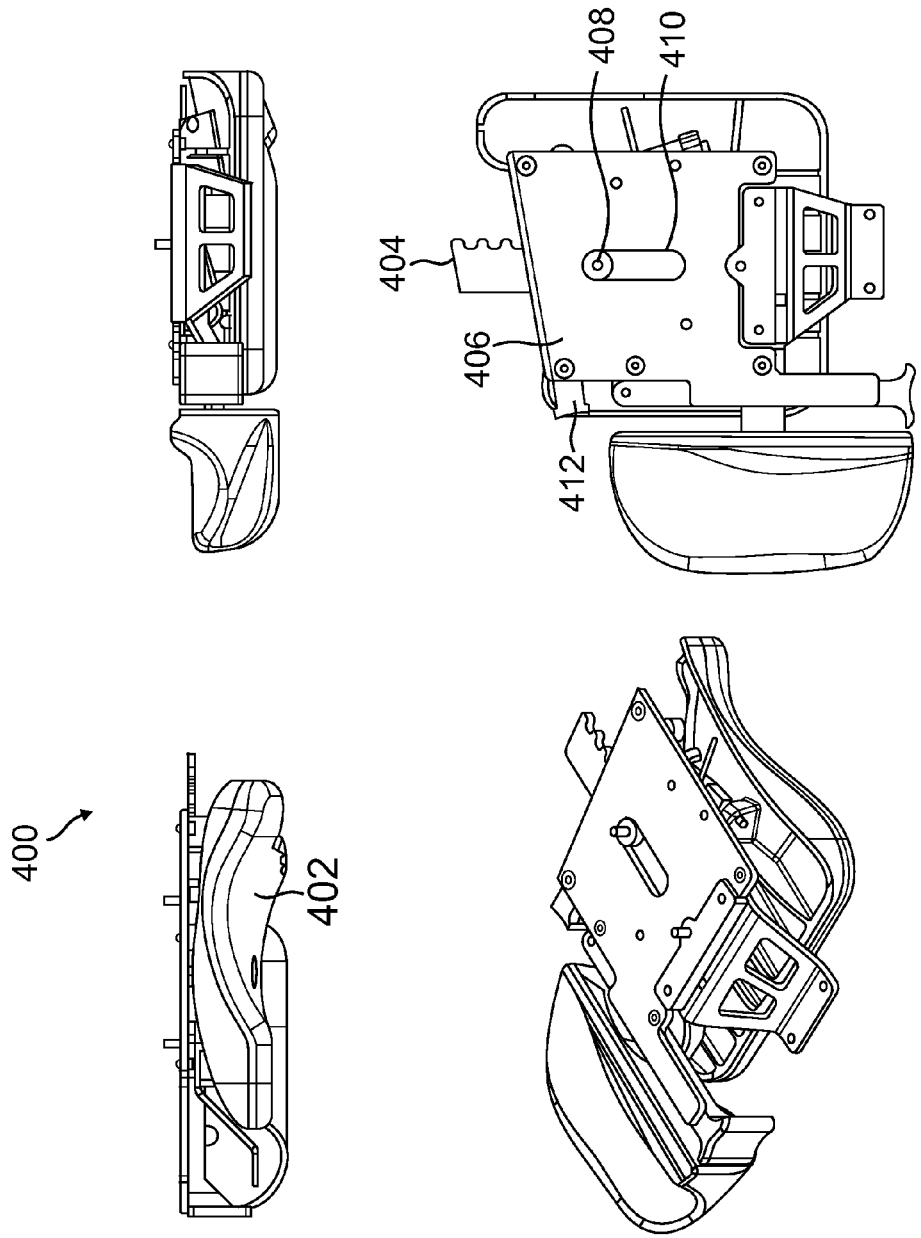
FIGS. 4A-4B illustrate various perspective views of another example mechanism of a shoulder pad system.
Figure 4B:
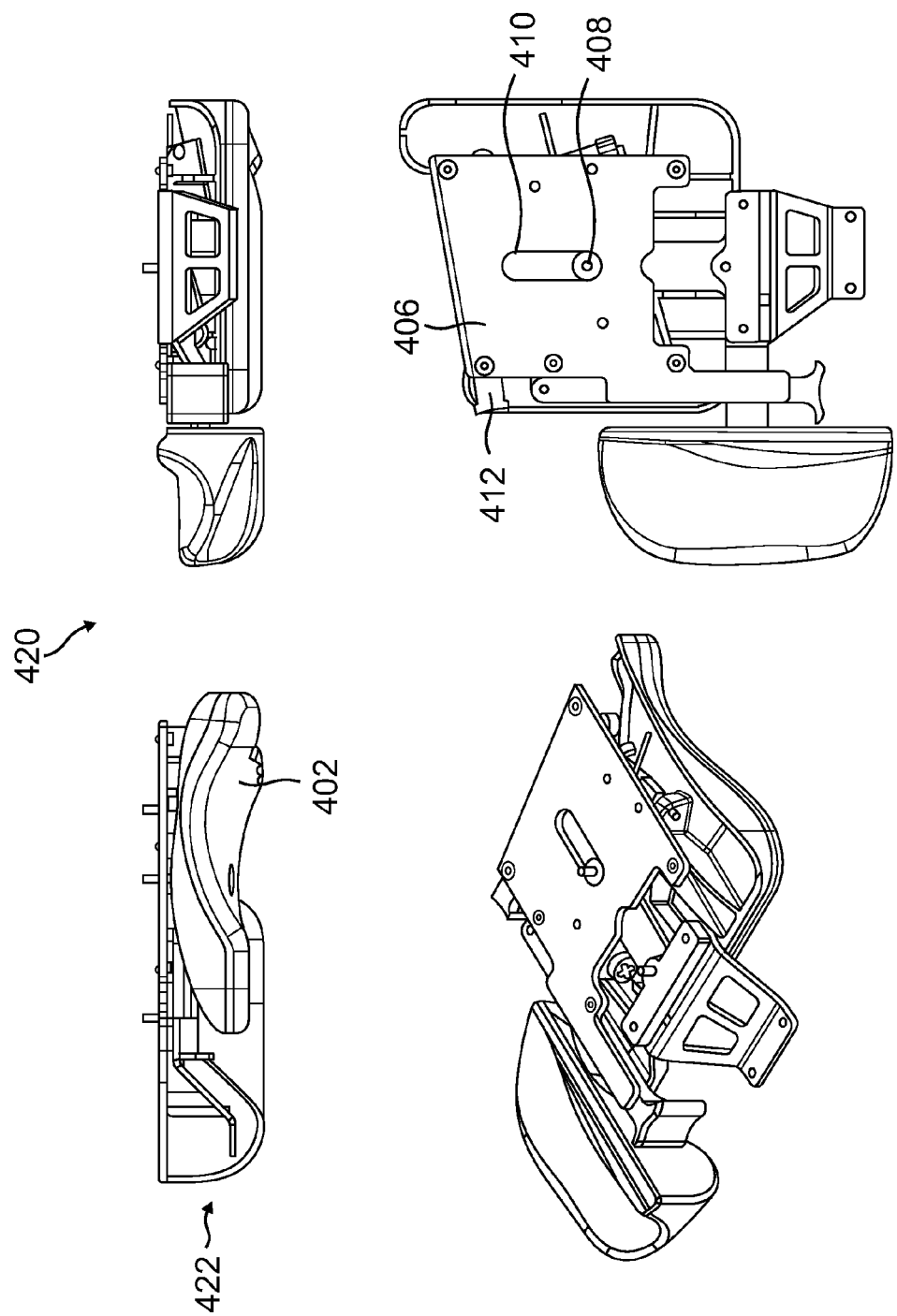

Certain embodiments provide a pad that can be manipulated in multiple directions. FIGS. 4A-4B illustrate various perspective views of another example mechanism of a shoulder pad system. More specifically, FIGS. 4A-4B illustrate an example of such a pad in an extended configuration 400 and in a retracted configuration 420. A mounting part 404 may secure pad 402 to a camera body 202. Mounting part 404 may be a component of a mechanism that comprises a plurality of plates that interact through ratchet and/or rack and pinion mechanisms. In one example, a base part 406 comprises a geared linear actuator that engages a ratchet or pinion (not shown) to enable a mounting plate 406 to be translated with respect to a base part 406. An actuator 408 may move in a generally linear direction for a distance limited or guided by a slot 410 and/or a shaft or bearing attached to a base part 406. The motion of the pad 402 may be generally arcuate or elliptical. In one example, the mounting part 404 may be hinged and a wedge or roller may translate linear motion to cause a rotational component in the movement of a pad element 402. In another example, a base part 404 may comprise one or more curved rails to which a mounting plate 406 is mounted.

An operator 112 may operate a release 412 to enable and/or cause movement of the pad element 402. One or more dampers and/or springs may be provided to resist and/or ease movement of the pad element 402. In some embodiments, the release 412 may also be used to cause movement of the pad element 402. By manipulating the pad elements 402, an operator 112 may cause pad system 206 to contact both the chest and back of the operator 112 in addition to the shoulder contact, thereby distributing weight and discouraging rotation of the camera 200 about the shoulder blade of the operator 112. Accordingly, the camera 200 can be better balanced better on the shoulder 116 of the operator 112.

Figure 5:
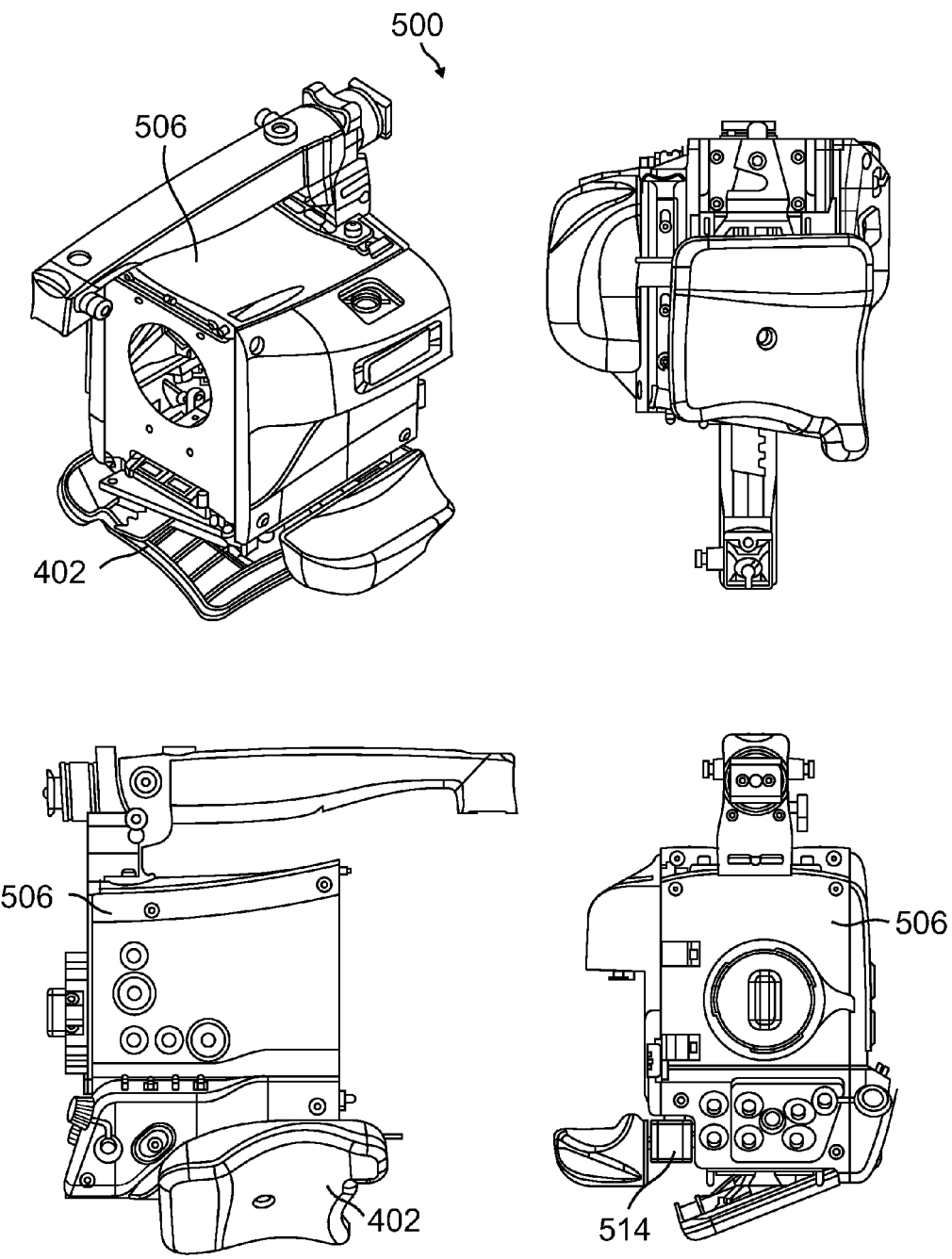
FIG. 5 illustrates various perspective views of yet another example mechanism of a shoulder pad system.

FIG. 5 illustrates various perspective views of yet another example mechanism of a shoulder pad system. More specifically, FIG. 5 illustrates certain aspects of a shoulder mount related to shoulder slope, including an embodiment in which a pad 402 may be angled to various degrees to more closely match the slope 118 (see FIG. 1) of the shoulder 116 of an operator 112. In some embodiments, the pad 402 is provided with a fixed or base angle, and differences in shoulder slope between operators can be absorbed or accommodated by memory foam and or by small manual adjustments of the pad 402. A camera may be maintained in a level orientation without additional lateral force or pressure 114 applied by the operator 112 through the use of a pad 402 that can be adjusted between a retracted configuration 500 and an angled configuration 520. In some embodiments, the pad 402 may accommodate a wide variation in the slope of the shoulders of various operators 112. In configuration 520, the pad 402 is deployed at a desired pad angle. In configuration 500, a tripod mount is facilitated when the pad 402 is in a level orientation. A release 514 may be provided in a location accessible to operator 112 to facilitate adjustment of pad slope.

Figure 6A:
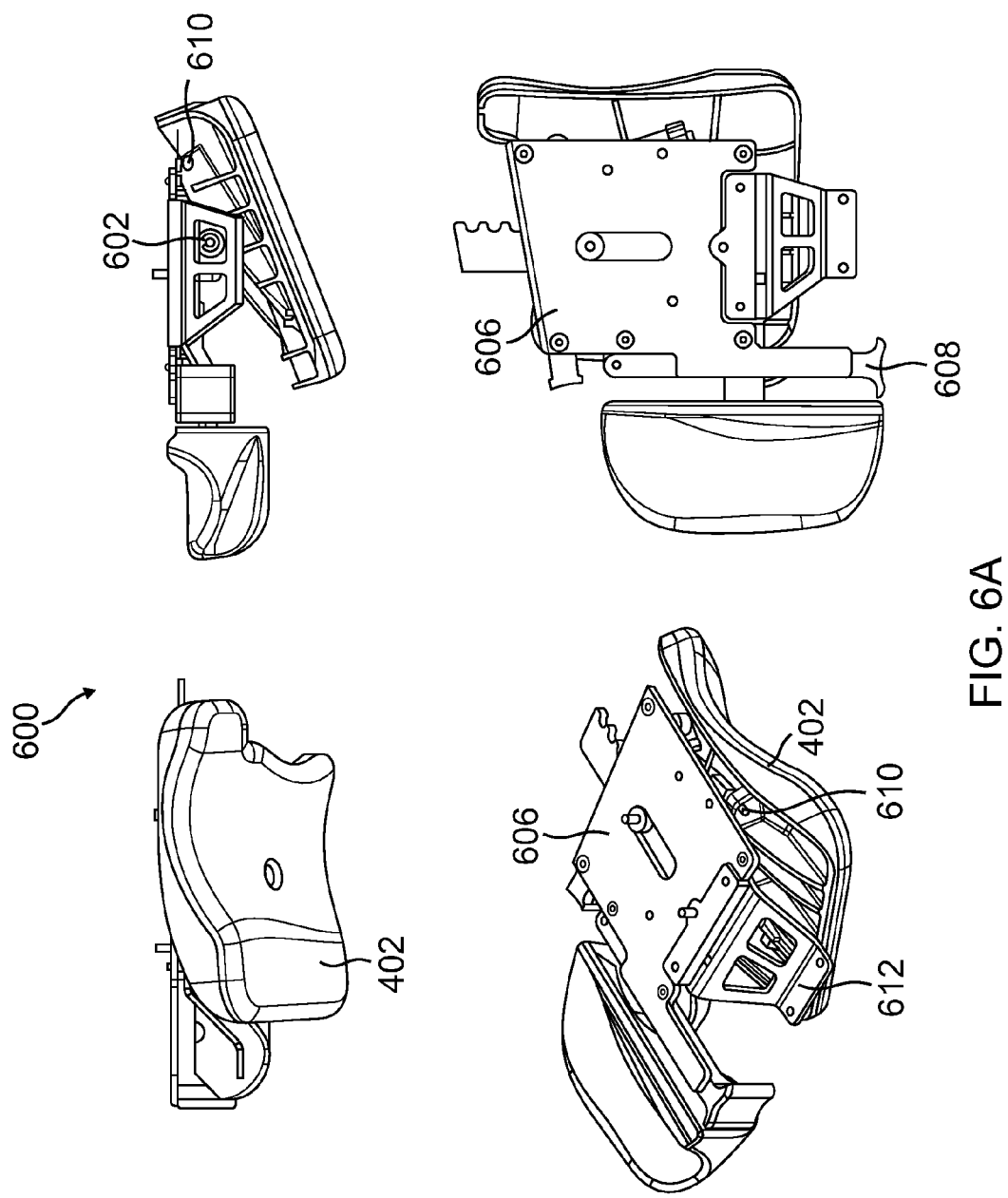
FIGS. 6A-6B illustrate various perspective views of an additional example mechanism of a shoulder pad system.
Figure 6B:
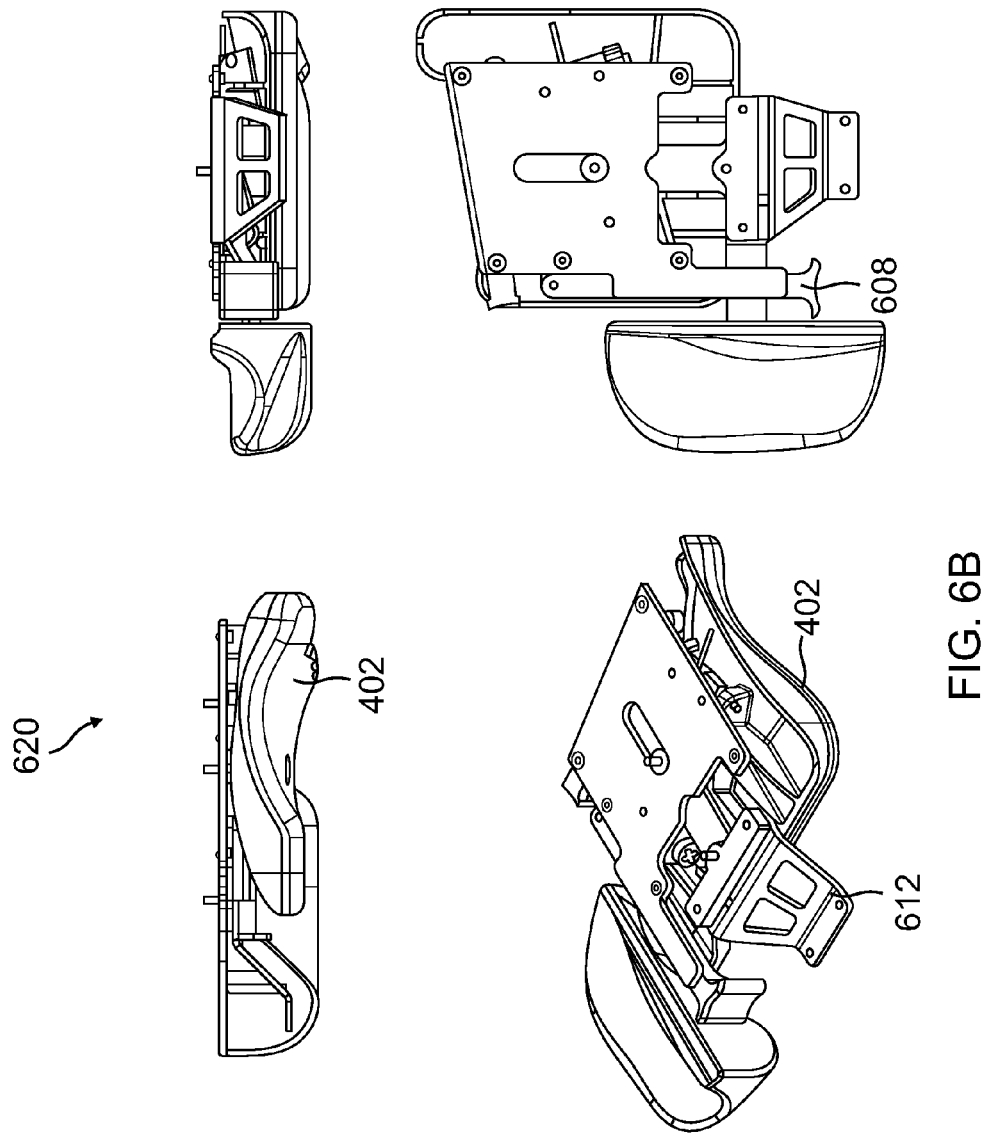

FIGS. 6A-6B illustrate various perspective views of a further example mechanism of a shoulder pad system. More specifically, FIGS. 6A-6B illustrate an example of a mechanism that allows an operator to adjust rotation of a pad 402. A mounting plate 606 may secure the pad 402 to a camera body 202. As shown at 600, the pad 402 may be rotated about a hinged connection which may be implemented by an axle 806 (see FIG. 8) under an angle and acting as a hinge. A component 602 of the mechanism may act as a wedge, filling up the space when the pad 402 is lowered, thereby providing stiffness to the assembly. When used with a tripod, the pad 402 may be flattened, as shown at 620. A release 608 may be operated by the operator 112 to enable and/or cause rotation of pad 402. The release 608 may be coupled to a ratchet arm 802 (see FIG. 8) that controls the location of a roller 602, which controls the angle of pad 402 based on distance of the roller 602 from the hinge 610. One or more dampers and/or springs may be provided to resist and/or ease movement of the pad element 402. Base plate 606 may be fastened to camera body 202 by one or more mounting brackets 612.

Figure 7A:
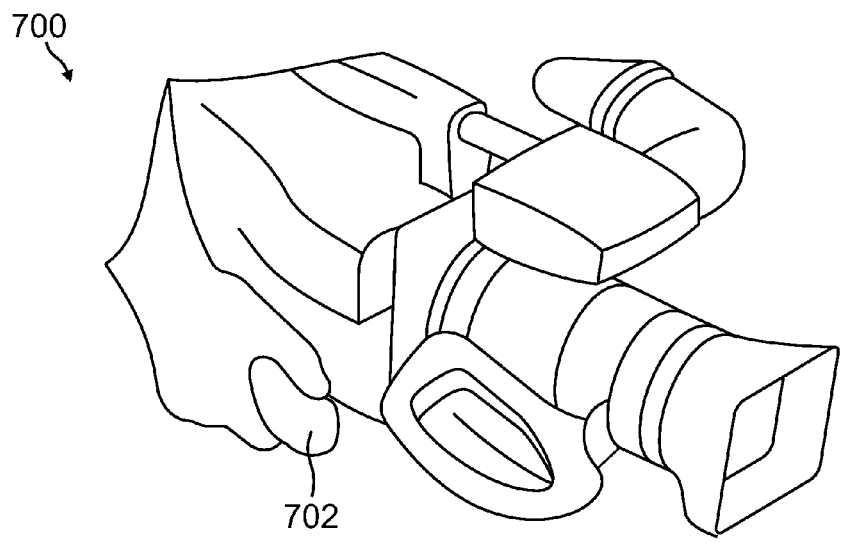
FIG. 7A illustrates an example use of a grip.
Figure 7B:
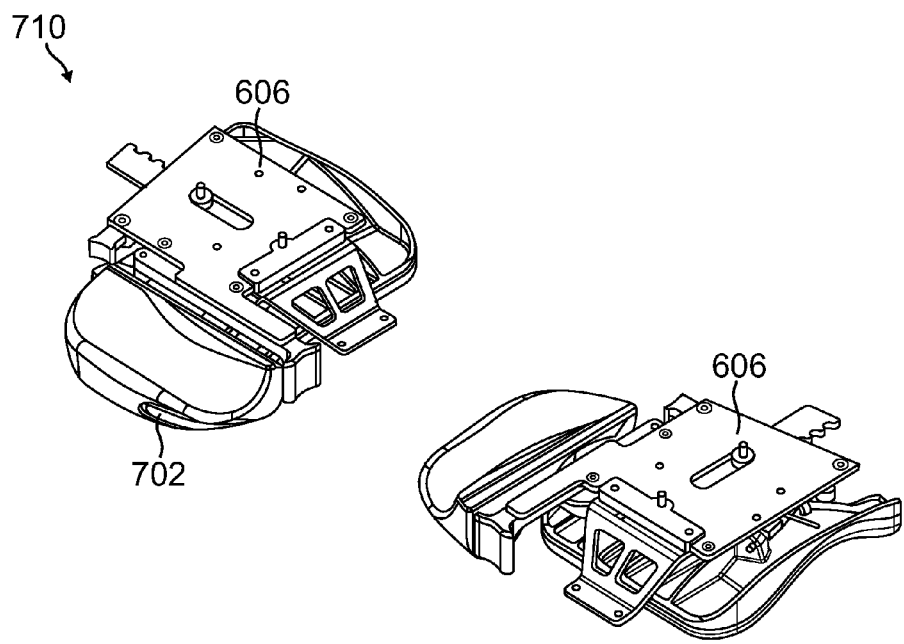
FIG. 7B illustrates an example mechanism of the grip.

FIG. 7A illustrates an example use of a grip 702. FIG. 7B illustrates an example mechanism of the grip 702. Grip 702 may be integrally attached to a mounting plate 606 used to attach the pad 402 to the camera body 202. The grip 702 permits an operator 112 to control a camera 200 when the camera 200 is operated while off the shoulder 116.

Figure 8A:
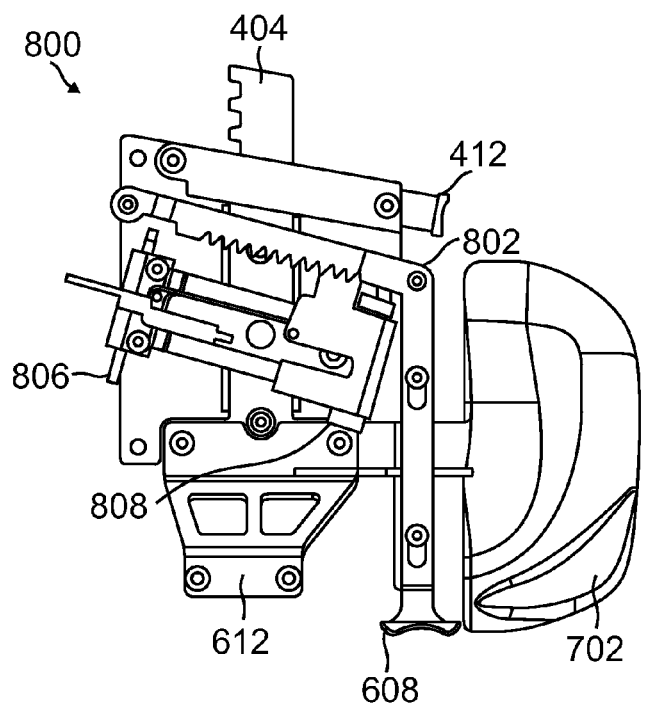
FIGS. 8A-8B illustrate an example mechanism controlling the shoulder pad.
Figure 8B:
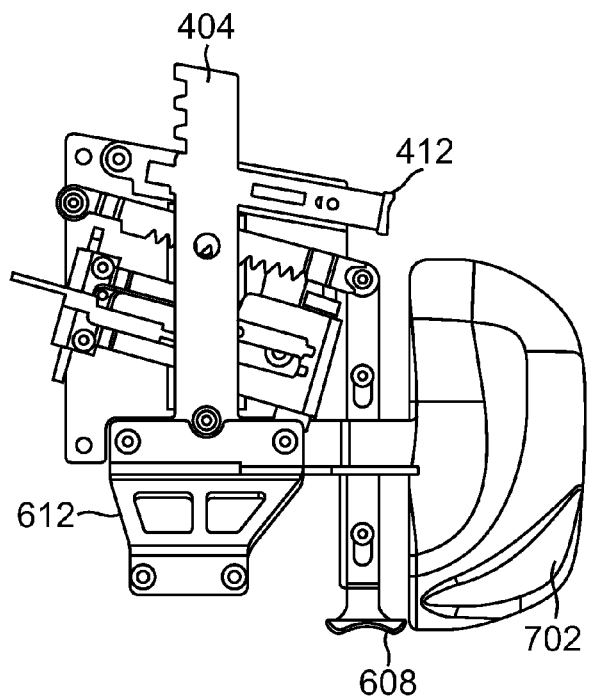

FIGS. 8A-8B illustrate an example mechanism used to control the configuration of the shoulder pad. In particular, elements of the mechanism illustrate additional aspects of the action of mechanisms described herein for the tilting, rotating and extending a pad 402. In some embodiments, a shoulder mount 710 for a video camera 200 comprises a base plate 706 adapted to be fastened to a camera body 202 (see FIGS. 2A, 7B). Base part 404 may be directly fastened to a bottom surface of the camera body 202 using fasteners such as screws, bolts, rivets, and so on (see FIGS. 2A, 4A). One or more mounting brackets may be used to mount the base part 404 to the camera body 202 (see FIGS. 2A, 4A).

Referring back to FIGS. 1A-1B, 2A-2B, 4A-4B, 6A-6B, and 7A-7B, the shoulder mount may comprise one or more pads 402 that may be movably attached to the plate 606 by a mechanism that facilitates the rotation, translation and/or tilting of the pad 402. One or more releases 412, 608 may be positioned to permit an operator 112 to actuate the mechanisms while using the camera 200, thereby unlocking and/or otherwise enabling the pad 402 to be repositioned with respect to the camera body 202. Typically, a "tripod configuration" may be defined in which all pads 402 are fully confined within the space occupied by a recess 204 in the camera body 202. Such retraction may allow the attachment of a tripod or other mechanical mount. The recess 204 may be concave and/or generally arcuate in form, although the recess may alternatively have a cuboid or other shape. The recess 204 may be provided in a bottom surface of the camera 200. At least a portion of the bottom surface may be substantially planar to receive a tripod mount.

In some embodiments, a front surface of the camera body 202 may have a lens attachment fixture 224 that receives and attaches a lens assembly 104.

In some embodiments, at least one pad 402 may be translated along a direction 220 toward the front surface of the camera body 202 and/or downwards from the camera body 202 when a first release 412 is actuated. In some embodiments, at least one pad 402 may be rotated about an axis that is substantially parallel to an axis of the recess 204 when the first release 412 is actuated. The motion of a pad may be coordinated and may serve to effectively "clamp" the pad system 206 to the shoulder 116 of operator 112.

In some embodiments, at least one pad 402 may be rotated about a hinge 610. An axle 706 may act as a hinge that operates under the influence of roller 602, which may function as a wedge that fills space when the pad is lowered, thereby improving stiffness to the construction. The hinge 610 may be located proximate to an edge defining the bottom surface of the camera body.

In some embodiments, a grip 702 is fixedly attached to the plate 606, the base part 404 and/or to the bracket 612 such that it is deployed toward a side and the bottom of the camera body 202.

In some embodiments, a pad 402 may have a multilayer structure. The multilayer structure may include a stiffening layer 210 and/or 214. The stiffening layer 210 and/or 214 may be constructed from one or more of a metallic layer, a hardened rubber layer, and a polymer layer. In one example, a metallic plate 306, 308 or layer 210, 214 may be provided for reinforcement. In some embodiments, an outer layer 212 and/or 216 may be provided to soften the point of contact with the body of operator 212. The outer layer 212 and/or 216 may be constructed from soft rubber, silicone, cloth, memory foam, polymer foam, or other suitable material.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A shoulder mount for a video camera, comprising:
   a mounting plate adapted to be fastened to a camera body; and
   at least one pad movably attached to the mounting plate and positioned within a recess of the camera body, wherein the at least one pad is configured to move relative to the mounting plate, while attached to the mounting plate, to adjust a fit of the at least one pad to a shoulder of a user, wherein the at least one pad comprises a pad that translates toward the front of the camera body and downwards from the camera body; and
   a first release that is actuated to enable translation of the pad that translates toward the front of the camera body and downwards relative to the camera body,
   wherein the at least one pad comprises a second pad that rotates about an axis located within the recess and proximate to an edge of the bottom surface of the camera body when a second release is actuated.

2. The shoulder mount of claim 1, wherein a front surface of the camera body has a lens attachment that receives and attaches a lens, and wherein the recess is arcuate and located on a bottom surface of the camera body and below and behind the lens attachment.

3. The shoulder mount of claim 1, wherein the at least one pad comprises the second pad that rotates when the first release is actuated.

4. The shoulder mount of claim 1, further comprising a grip fixedly attached to the camera body and extending away from two substantially parallel edges of the bottom surface of the camera body.

5. A shoulder mount for a video camera, comprising:
   a mounting plate adapted to be fastened to a camera body; and
   at least one pad movably attached to the mounting plate, wherein the at least one pad is fully confined within a recess of the camera body, wherein the camera body has a front surface comprising a lens attachment configured to receive and attach to a lens, wherein the at least one pad comprises a first pad that rotates about an axis parallel to an edge of the bottom surface of the camera body, and wherein the edge is perpendicular to the front surface and extends from the front surface toward a rear surface of the camera body.

6. The shoulder mount of claim 5, wherein the first pad rotates when a first release is actuated.

7. The shoulder mount of claim 5, wherein the recess is arcuate and located on a bottom surface of the camera body that is perpendicular to the front surface.

8. The shoulder mount of claim 5, wherein the at least one pad comprises a second pad that translates toward the front surface of the camera body and downwards from the bottom surface when a second release is actuated.

9. The shoulder mount of claim 8, further comprising a grip fixedly attached to the edge of the bottom surface of the camera body and extending away from two substantially parallel edges of the bottom surface of the camera body.

10. The shoulder mount of claim 1, wherein the at least me pad comprises a plurality of layers.

11. The shoulder mount of claim 10, wherein the plurality of layers includes a stiffening layer.

12. The shoulder mount of claim 11, wherein the stiffening layer includes one or more of a metallic layer and a polymer layer.

13. The shoulder mount of claim 10, wherein the plurality of layers includes a layer constructed from at least one of memory rubber and memory foam.

14. The shoulder mount of claim 1, wherein the at least one pad is attached to a reinforcement.

15. The shoulder mount of claim 14, wherein the reinforcement is constructed from one or more of aluminum, titanium, steel, an alloy, carbon fiber, or polymer.

16. A grip for a video camera, comprising:
    a mounting plate adapted to be fastened to a camera body;
    at least one pad movably attached to the mounting plate and positioned within a recess of the camera body, wherein the at least one pad is configured to move relative to the mounting plate, while attached to the mounting plate, to adjust a fit of the at least one pad to a shoulder of a user, wherein the at least one pad comprises a pad that translates toward the front of the camera body and downwards from the camera body; and
    a grip fixedly attached to the mounting plate and extending away from the camera body; and
    a first release that is actuated to enable translation of the pad that translates toward the front of the camera body and downwards relative to the camera body,
    wherein the at least one pad comprises a second pad that rotates about an axis located within the recess and proximate to an edge of the bottom surface of the camera body when a second release is actuated.

17. The grip of claim 16, wherein the at least one pad comprises the second pad that rotates when the first release is actuated.

18. A video camera, comprising:
    a camera body;
    a mounting plate fastened to the camera body; and
    at least one pad moveably attached to the mounting plate and positioned within a recess of the camera body, wherein the at least one pad is configured to move relative to the mounting plate, while attached to the mounting plate, to adjust a fit of the at least one pad to a shoulder of a user, wherein the at least one pad comprises a pad that translates toward the front of the camera body and downwards from the camera body; and
    a first release that is actuated to enable translation of the pad that translates toward the front of the camera body and downwards relative to the camera body,
    wherein the at least one pad comprises a second pad that rotates about an axis located within the recess and proximate to an edge of the bottom surface of the camera body when a second release is actuated.

19. A video camera, comprising:
    a camera body having a front surface comprising a lens attachment configured to receive and attach to a lens;
    a mounting plate fastened to the camera body; and
    at least one pad moveably attached to the mounting plate and positioned within a recess of the camera body,
    wherein the at least one pad comprises a first pad that rotates about an axis parallel to an edge of the bottom surface of the camera body, and wherein the edge is perpendicular to the front surface and extends from the front surface toward a rear surface of the camera body.

20. The video camera of claim 19, wherein the first pad rotates when a first release is actuated.

21. The video camera of claim 19, wherein the at least one pad comprises a second pad that translates toward the front surface of the camera body and downwards from the bottom surface when a second release is actuated.

* * * * *